Z. ALESANI.
BICYCLE AND MOTOR CYCLE ATTACHMENT.
APPLICATION FILED NOV. 14, 1910.
1,077,210.
Patented Oct. 28, 1913.
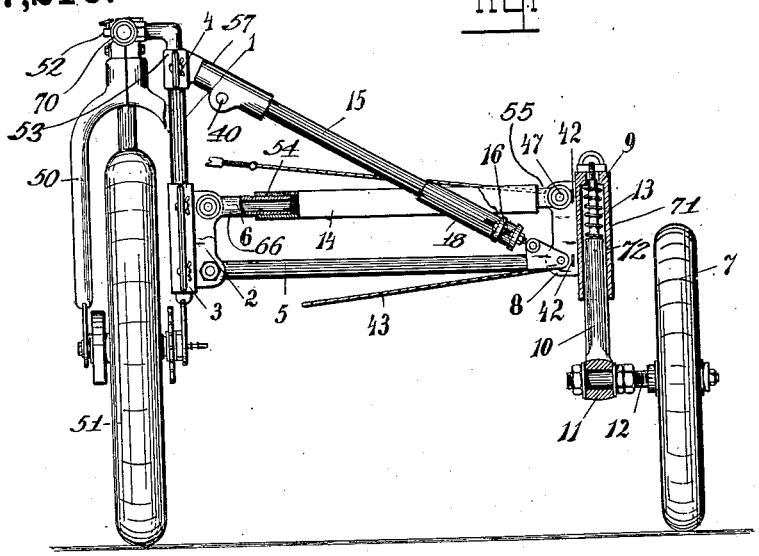
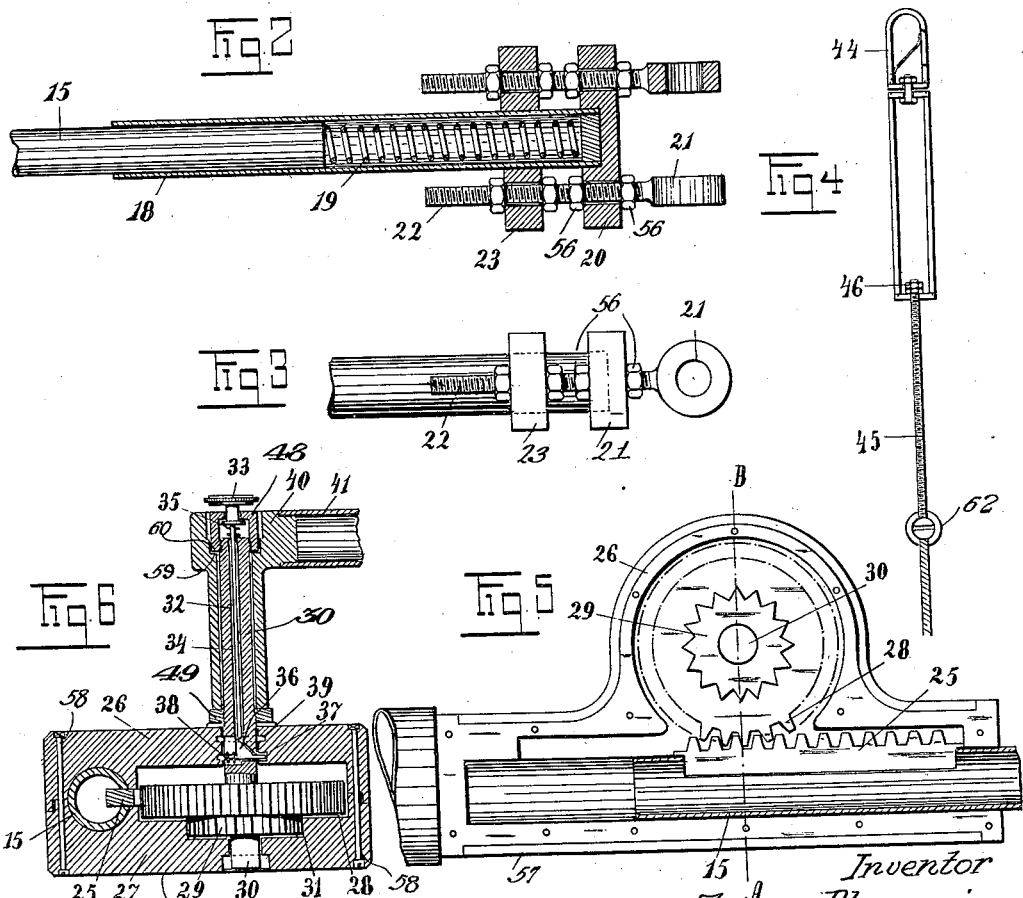
Witnesses
F. Stapel
C. Heymann
Inventor
Zeno Alesani
by B. Singer Att'y

UNITED STATES PATENT OFFICE.

ZENO ALESANI, OF TRIESTE, AUSTRIA-HUNGARY.

BICYCLE AND MOTOR-CYCLE ATTACHMENT.

1,077,210. Specification of Letters Patent. Patented Oct. 28, 1913.

Application filed November 14, 1910. Serial No. 592,356.

*To all whom it may concern:*

Be it known that I, ZENO ALESANI, a subject of the Emperor of Austria-Hungary, and a resident of Trieste, in the Empire of Austria-Hungary, have invented new and useful Improvements in Bicycle and Motor-Cycle Attachments, of which the following is a specification.

This invention relates to two wheel vehicles having the wheels in one common plane, like bicycles or motor-cycles.

An object of the invention is to combine with the vehicle a third wheel which may easily be detached therefrom, for the purpose of increasing the stability of the vehicle while the same is in motion and for prevention of skidding or slipping.

Another object of the invention is to dispose the additional wheel in a plane parallel to the common plane of the ordinary wheels and to maintain the additional wheel resiliently and adjustably in said plane.

With these and other objects in view an embodiment is illustrated in the accompanying drawing, wherein similar reference numerals refer to similar elements.

In the drawing Figure 1 is a rear view of a bicycle having the third wheel attached, certain parts being shown in section. Fig. 2 is a sectional view of a part of a brace on a larger scale. Fig. 3 is a side view thereof. Fig. 4 shows a portion of a connecting cable with a hook attached thereto. Fig. 5 is a sectional view through the adjusting device of the brace and Fig. 6 is a section on line A—B of Fig. 5.

The bicycle or motorcycle comprises a frame 50 in which the running wheels 51 are held in one common plane by any suitable means. A rod 1 provided with a lateral projection 52 is secured to the frame and is adjustably held thereon by a fastening device 70. A split sleeve 3 is slidably mounted on the rod 1 and may be held in adjusted position by means of the wing nuts 4. A plurality of brackets 2 are connected with the sleeve 3; two arms 5 and 6 extend from these brackets, the arms being pivotally secured to the brackets and resting with their other ends in similar brackets 8 fastened to or integral with a sleeve 9. The sleeve 9 incloses the upper end of a supporting structure 71 for an additional wheel 7, the structure comprising a rod 10 which forms at its lower end a bearing 11 for the axle 12 of the additional wheel. A spring 13 is interposed between the inner end of the sleeve 9 and a shoulder 72 on the rod 10 maintaining thereby the third wheel 7 in resilient connection with the vehicle. By reference to the drawing it will be seen that the arms 5 and 6 will remain parallel to each other even when the direction of said arms with respect to the rod 1 varies from a right angle to any other angle. An additional arm 15 forms a resilient brace and is connected with the rod 1 by means of a split sleeve 53 which is also adjustable on the rod 1 and which may be tightened thereon by means of the wing nut 4. The upper end of the arm 15 carries a casing 57 comprising two parts 26 and 27, said casing serving to receive an adjusting device by means of which the length of this brace may be varied arbitrarily. As the brace 15 extends in angular direction with respect to the arms 5 and 6, and as it is located preferably in one plane with said arms, it is necessary to provide means for allowing the passage of the brace 15 through the upper arm 6. For this purpose the arm 6 comprises a tubular socket 54 which is mounted on the stub 66 and another socket 55 pivotally secured to the upper pin 47 in the bracket 8. The intermediate portion between the two sockets is bifurcated as shown in Fig. 1, and brace 15 is shown to extend through the space between the prongs of the bifurcated portion.

As shown in Fig. 2 the lower end of brace 15 rests on a spring 19 interposed between the brace and a plate 20, which is secured to the bracket 8 by means of eyes 21 of eyebolts 22. A second plate or flange 23 is adjustably fastened to the bolts 22 and serves for guiding a tubular member 18 which incloses the lower end of the brace 15 and the spring 19 serving thereby to maintain the spring in alinement with the rod and also serving as a guiding means for the brace 15.

The tension of the spring 19 may be varied by adjusting the nuts 56 on their bolts, this adjustment serving to change the distance of the lower end of the tubular member 18 from the lower end of the brace 15, compressing thereby the spring or releasing the tension thereof. The other end of the bracing arm 15 is inclosed within the casing 57 which is composed of the parts 26 and 27, as clearly shown in Fig. 6, said parts being held together by means of rivets or screws 58. This end of the bar is provided with a rack 25 engaging with a gear 28, rigidly mounted on the shaft 30. The shaft 30 is rotatable within the casing 57 and is also axially slidable therein. The hub 40 of a handle 41 is rigidly connected to the shaft 30 by the upper nut 48 and the lower nut 49. The handle 41, therefore, serves to rotate the gear 28 and also to displace it lengthwise of its axis, the allowable amount of such displacement being limited by the clearance between this gear wheel 28 and the inner surface of the recess within which it is mounted. The toothed portion of the gear wheel 28 is broader than the width of rack 25, by such an amount that the rack and wheel will always remain in engagement irrespective of the axial displacement of the latter. Rigidly connected with the gear 28 is a toothed wheel 29, which latter in the position of parts shown in Fig. 6 enters a mating recess in the part 27. This recess has projections adapted to intermesh with the teeth on the wheel 29, and serves to lock the toothed wheel 29, the gear wheel 28, the shaft 30 and the handle 41 against rotation. Passing transversely through the shaft 30 is a pin 37 having a wedge shaped projection 36. Spring 38 normally tends to press the pin 37 outward and in the position of parts shown in Fig. 6, the action of the spring 38 causes the pin 37 to engage an annular groove in the part 26 as shown in the said figure. The pin 37, therefore, locks the parts against axial displacement and the toothed wheel 29 entering the mating recess in part 27, locks the mechanism against rotation. Extending through a tubular bore 32 of the shaft 30 there is a rod 34 carrying a button 33 and normally held in the position shown in Fig. 6 by the spring 35. By depressing the button 33 the lower end of the shaft 30 engaging the wedge shaped projections 36 causes the pin 37 to move back out of engagement with the annular groove and when this occurs the mechanism may be displaced axially until the pin 37 registers with the annular groove 39. If the button 33 is now released the pin 37 will enter the slot 39 under the action of the spring 38, thus locking the mechanism against axial motion. The thickness of the toothed wheel 29 is so proportioned that when the pin 37 engages the groove 39 as described above, the toothed wheel 29 is free of its mating recess in the part 27 and the mechanism is therefore free to rotate.

As has already been explained, the face of the gear wheel 28 is so wide that its engagement with the rack 25 is not affected by its axial displacement so that in this new position of the parts rotation of the handle 41 will cause the gear wheel 28 to actuate the rack 25 and thus adjust the length of the brace 15. When the desired adjustment has been effected, the button 33 is again depressed, disengaging the pin 37 from the groove 39, and the mechanism is slid axially until the toothed wheel 29 engages its mating recess in the part 27. The button 33 is then released and the pin 37 under the action of the spring 38 reëngages the lower annular groove as shown in Fig. 6, thus locking the adjusting mechanism in its new position.

For the purpose of preventing undue oscillation of the additional wheel 7 which may be caused by unevenness of the road, tension wires or cables 43 are secured at 42 to the bracket 8 and leading to parts of the frame 50 of the vehicle. (Not shown.) The tension of these cables or wires may be adjusted by means of the screws 45 which are connected to them by the eyes 62 (Fig. 4), said screws 45 passing through frames and carrying the nuts 46. Snaphooks 44 are attached to the other end of the frame for the purpose of facilitating the attachment or detachment of the wires.

I claim:

1. A two wheel vehicle comprising in combination, a frame, wheels held in one plane by said frame, an additional detachable wheel, a resilient supporting structure for said additional wheel, arms for uniting said wheel with the frame and a longitudinally adjustable brace, extending from said supporting structure to a frame portion.

2. A two wheel vehicle comprising in combination, a frame, wheels held in one plane by said frame, an additional detachable wheel outside of said plane, a supporting structure for said additional wheel, and a telescoping brace adjustable in length, leading from said structure to a frame portion, the means for adjusting the length of the said brace comprising a rack bar on one section of the brace, a gear engaging with said rack bar, a pivot for the gear in the second section of the brace, and means for normally locking the said gear against rotation.

3. A two wheel vehicle comprising in combination, a frame, wheels held in one plane by said frame, an additional detachable wheel outside of said plane, a supporting structure for said additional wheel, a telescoping brace, adjustable in length, leading from said structure to a frame portion, means for adjusting the length of the said brace comprising a rack bar on one section of the brace, a gear engaging with said rack bar, a pivot for the gear on the second section of the brace, a toothed wheel integrally connected with the said gear, a casing inclosing the gear and the toothed wheel, means in the casing for normally engaging the toothed wheel to prevent rotation thereof, and means for releasing the toothed wheel from said engagement, and for actuating the said gear to operate the rack bar.

In testimony whereof I affix my signature in presence of two witnesses.

ZENO ALESANI.

Witnesses:
IGNAZ KNÖRPSCHNACHLE,
ADA MARIA BERGER.

Copies of this patent may be obtained for five cents each, by addressing the "Commissioner of Patents, Washington, D. C."